Feb. 8, 1949. W. C. BARNES ET AL 2,461,252
METHOD AND APPARATUS FOR DETECTING FLAWS
Filed June 5, 1944 2 Sheets-Sheet 1
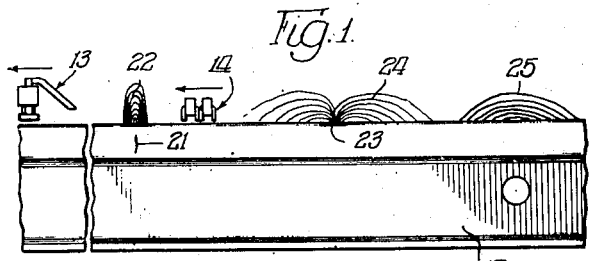
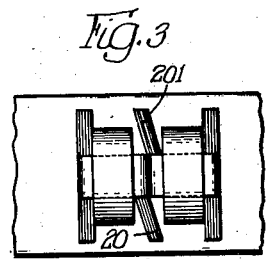
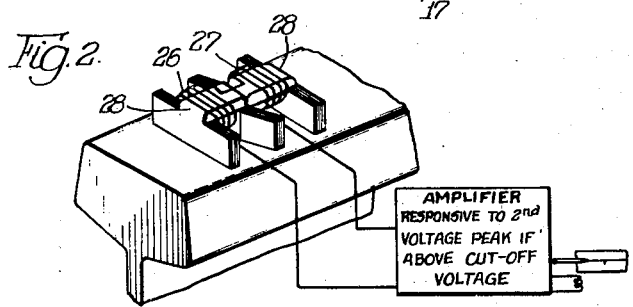
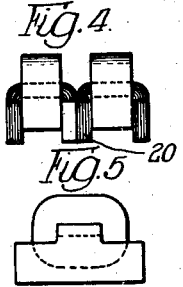
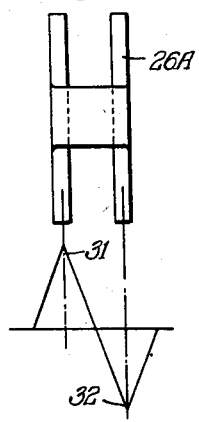
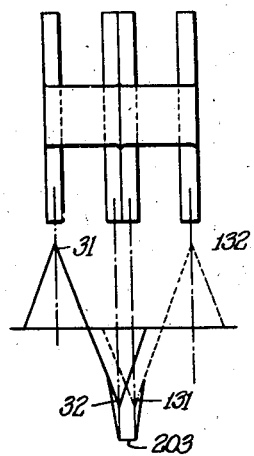
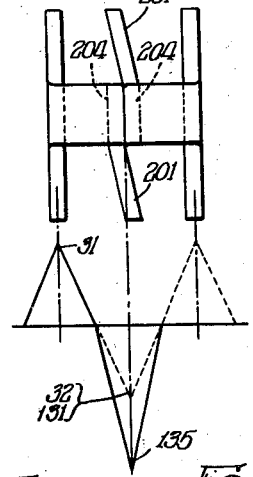
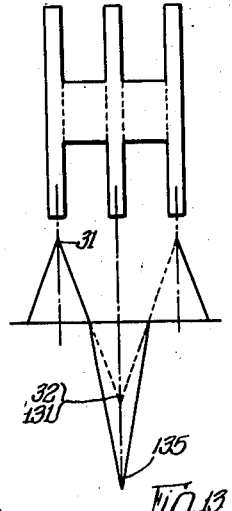
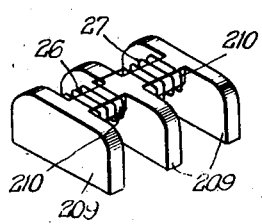
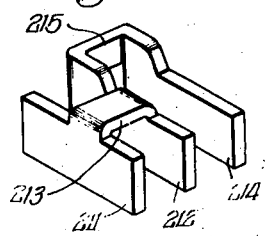
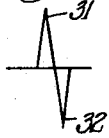
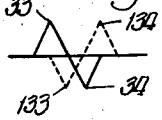
INVENTORS
Walter C. Barnes and
BY Henry W. Keevil Feb. 8, 1949.  W. C. BARNES ET AL  2,461,252
METHOD AND APPARATUS FOR DETECTING FLAWS
Filed June 5, 1944  2 Sheets-Sheet 2

TUBE CHARACTERISTIC—
GRID VOLTAGE VS. PLATE MA.

Inventors:
Walter C. Barnes and
Henry W. Keevil
By Mann, Brown & Co.
Attys

Patented Feb. 8, 1949

2,461,252

UNITED STATES PATENT OFFICE 2,461,252

METHOD AND APPARATUS FOR DETECTING FLAWS

Walter C. Barnes, Lake Bluff, and Henry W. Keevil, Evanston, Ill.

Application June 5, 1944, Serial No. 538,818

17 Claims. (Cl. 175—183)

This application is a continuation-in-part of our prior application, Serial No. 482,526, filed April 10, 1943, now abandoned.

The testing of rails in railroad track by detector cars running thereon has now progressed to such a point that the chief obstacle to further improvement has been the difficulty of eliminating false indications due to physical characteristics or irregularities resulting from wheel burns, gags caused by straightening the rail at the mill, magnetic spots, etc. when the detector is adjusted to detect small fissures. The residual magnetic system can easily be made sensitive enough to pick up extremely small fissures, but under such circumstances (as in any other system) there is an increased tendency to record irregularities other than fissures.

When any given apparatus records a large number of irregularities other than fissures, too much delay would be caused by stopping to make a hand check at each irregularity to determine by the reliable hand-check methods whether or not a fissure is present. It is, therefore, inevitable that under such conditions, the test crew must use its judgment. If, at the point where an irregularity has been detected, some surface defect is seen which would probably have caused the indication of an irregularity, the crew must often pass on without stopping for a hand check. In the past there has been no entirely reliable check on the judgment of the crew if no hand check was considered necessary.

In practice, some of the difficulties have been avoided by the use of a coil running along the gauge side of the rail-head, but it has its handicaps and limitations.

According to the present invention, a very high degree of distinguishing ability is provided with a pick-up which may run along the top of the rail. This is best accomplished through the cooperation of a new amplifying circuit and a new detector unit.

As disclosed in our copending application Serial No. 482,526, the detector unit comprises preferably a pair of coils with longitudinally disposed core structure, the core within each coil having a pole approaching the rail in front of and to the rear of its coil and the cores having no air gap between them. If the coils have a single pole between them, or have the two poles between them overlapping so that they coincide as to longitudinal positioning, the results are surprisingly better than the exceptionally good results from the structure of that application. Each core is relatively short, about three fourths of an inch, including the poles, having been found to be a very satisfactory length. One such coil can be used alone and has some advantage, at least in conjunction with the special amplifying circuit, in distinguishing between fissures and other irregularities. When two such coils are used, however, particularly end to end, and more particularly as disclosed, the distinguishing ability is further increased.

The amplifying circuit is preferably one which first cuts out all impulses below a predetermined voltage intensity and which then so amplifies and stretches out the very brief fissure impulses which are not cut off as to actuate the recorder in spite of the brevity of the impulse.

Additional advantages and objects of the invention will be apparent from the following description and from the drawings in which:

Fig. 1 is a diagrammatic illustration suggestive of the differences in magnetic fields adjacent a fissure and adjacent non-fissure irregularities such as wheel burns; or bolt holes.

Fig. 2 is a perspective view of the preferred form of pick-up unit of this invention as it appears at the top of a rail-head;

Figs. 3, 4 and 5 are plan, side, and end views of the pick-up unit shown in Fig. 2;

Figs. 6, 7, 8 and 9 are charts indicating theoretical wave shapes with different pick-ups.

Figs. 10 and 11 are perspective views of modified forms of the invention.

Figs. 12 and 13 are approximate oscillograms of the voltage induced in single coils by a fissure and a burn respectively;

Figure 14:
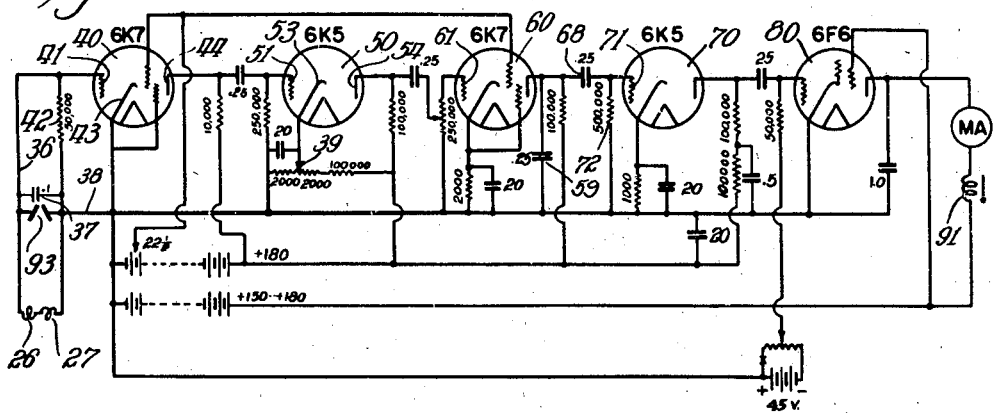
Fig. 14 is a circuit diagram showing the preferred type of amplifier.

The invention has been illustrated in connection with its use in the residual magnetic system of testing rails for flaws, although in some of its aspects, it is useful in other systems such as the electro-inductive system.

In the electro-magnetic system the rail is first energized by one or more (usually three) magnets represented diagrammatically by magnet 13. Thereafter a pick-up unit 14 is moved along the rail beyond the effective field of the magnet 13 so as to be subject to the influence of only the residual fields surrounding the rail in the vicinity of irregularities therein. The magnets are powerful electro-magnets and their main purpose is to apply a strong magnetic flux longitudinally through the rail 17 on which the detector cars carrying them and pick-up 14 are running. However, as the flux enters the rail, there is at the rail surface a strong vertical flux passing from the magnet pole to the rail.

The effects of this vertical flux may not be removed prior to exploring with the pick-up unit 14 and hence the pick-up unit 14 encounters two types of magnetic fields. The more common and more dangerous internal flaws such as the transverse fissure 21 are strongly affected by the longitudinal flux in the rail and produce a magnetic field which is generally of the type shown at 22 although no effort has been made to plot the field exactly. Surface defects, however, are relatively unaffected by the longitudinal flux since they are on a horizontal plane as indicated by the burn 23, parallel to the longitudinal flux. These defects, however, appear to be traversed and strongly affected by the vertical flux as it is entering the rail so that in effect such horizontal defects are polarized with vertical poles. For example, the metal all along the burn adjacent the top of the rail may retain a vertical magnetization in which case magnetic flux will tend to pass upwardly from the burn and out in all directions to re-enter the rail beyond the burn, as illustrated roughly at 24. Whether this is really the nature of the field or not is not essential to a disclosure of this invention. In fact, this invention also distinguishes between fissures and bolt holes, and the field of the latter is believed to be more like 22 except for being spread out more and having a more gradual gradient as seen at 25.

Although the vertical flux effects are minimized by the type of magnet 13 here shown, and described more in detail in another application of applicants, the fields characteristic of burns and other non-fissure irregularities have not yet been eliminated entirely.

An important object of this invention is to provide a detecting apparatus which is so selectively responsive to the type of fields characteristic of fissures that it may be given a high degree of sensitivity with respect to fissure fields 22 so as to pick up and record even small fissures while being relatively insensitive to other irregularities or to their fields, such as the fields 24 or 25 so as not to record these in spite of its high sensitivity for fissures.

The pick-up unit shown in Figs. 2 to 5 has been found to be exceedingly effective in distinguishing between the fissures field 22 and the fields such as 24 or 25 of other irregularities. This pick-up unit comprises a pair of coils 26 and 27 which should be connected in series opposition as indicated in Fig. 14. Each coil is wound on a core 28 (although the term "coil" is also commonly used to include a core 28). The cores may be identical. Each core has two poles, one in front of and one behind the core, these poles thus being longitudinally spaced along the rail.

All four poles may be of the same width, as seen in Fig. 7 and as disclosed in our previous application. The width illustrated in the previous application and which had been found satisfactory, is 1⅛ inches, about half the width of the rail head. It is now found that better results are obtained with a width of 2 inches, or nearly the full width of the top surface of the rail head.

One of these coils alone (including its core) can be used advantageously. At present it appears that best results with a single coil are obtained with a coil whose core's outside length is approximately ¾ inch but under varying conditions other lengths, especially shorter lengths, may be best. One inch also gives better results than the longer lengths formerly used.

In Fig. 12 it will be seen that the fissure field 22 produces in a coil 26 two narrow voltage peaks, a positive peak 31 and a negative peak 32. Other field irregularities on the other hand produce wider and more widely spaced peaks 33 and 34 which are usually lower, unless by comparison with a very small fissure. With amplifying systems which have been used heretofore, especially when the detector did not bring out the differences of altitudes in the peaks 31 and 33 as effectively as the present pick-up unit, it has been difficult to record some narrow peaks such as the peak 31 without also recording some wider peaks such as the peak 33 even if they were slightly lower. The peak 33 may have more area under it than the peak 31. Previous amplifiers have been more responsive to a lower-voltage, longer-continued impulse than to an impulse of shorter duration but slightly higher voltage.

Figure 15:
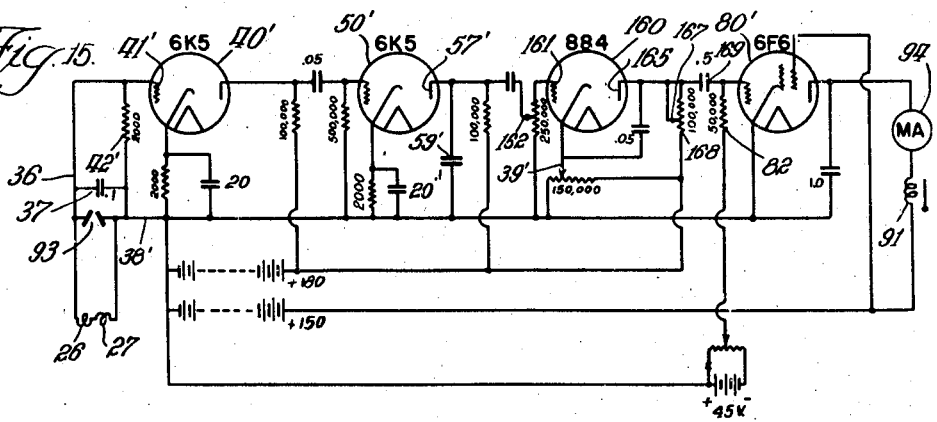
Fig. 15 is a circuit diagram showing a modified form of amplifier.

According to the present invention (also disclosed in the prior application), amplifying circuits of Figs. 14 and 15 are provided which are sufficiently quick acting in response to voltage above a predetermined level to actuate the recording instruments under influence of a narrow high voltage wave such as 31, while quite sharply cutting out any lower voltage wave such as 33. These circuits are described hereinafter.

Because of the fact that circuits have been too slow acting to record the narrow peak 31 unless considerably higher than necessary with a wider peak, effort has been expended heretofore in connection with electro-inductive systems in trying to put two peaks together so as to give a wave of longer duration. This may have been necessary to enable such systems to pick up any but large fissures, but the longer duration of the fissure waves made them resemble more closely the burn waves 33 and hence did not help in distinguishing between them.

The spacing preferred according to the present invention and its effects are best explained with reference to Figs. 6 to 9. Fig. 6 correlates with a core 26A a curve similar to that of Fig. 12, on the assumption that the peaks occur as the successive pole passes over the fissure. In Figs. 7 to 9, the peaks 31 and 32 represent the wave of the first coil 26, and the peaks 131 (coinciding with 32 in Figs. 8 and 9) and 132 represent the corresponding wave of the second coil 27, the polarity of this wave being reversed by the connection of coil 27 so that the first peak is negative. When the peak 32 of one wave and the peak 131 of the other wave exactly coincide as seen in Fig. 8, they will produce a combined peak 135. Theoretically, this peak should be twice as high as the single peaks 32 and 131 although Figs. 7 to 9 are intended to illustrate the principle involved rather than necessarily exactly what happens.

The spacing of the coils 26 and 27 preferred in practicing the present invention is the spacing which perfectly coincides the fissure peaks as illustrated in Figs. 8 and 9, or the spacing which gives the maximum combined voltage 135, these two statements meaning the same thing theoretically.

Both analysis and some preliminary test data indicate that in the case of a single coil passing over a fissure, the voltage peaks probably occur as the successive poles of the core pass over the fissure since these seem to be the times when there is the greatest rate of change of flux through the coil. In the case of 2 coils, this would mean that for perfect coinciding of the peaks, the first pole of the second coil should coincide in longitudinal position with the second pole of the first coil. Longitudinal coincidence is approximated by having the cores in contact end to end as seen in Fig. 7. Longitudinal coincidence, or even this approximation of it would seem to produce a low reluctance path from the first pole through both coils to the third pole and would seem to be objectionable because of the fact that any change in flux following this path would have no effect since the coils are connected in opposition. We have determined, however, that in spite of this theoretical analysis the two coils with their cores end to end are extremely effective in detecting fissures and also in distinguishing fissures from other irregularities. Apparently the flux adjacent fissures is so concentrated that it greatly prefers the short path to the long path with the result that it flows first through one core and then through the other, and hence is decreasing in one core as it increases in the other.

Careful tests of the pair of coils illustrated in Fig. 7 used in conjunction with the amplifier of Fig. 14 indicates that any reduction of the spacing of the coils below half an inch is advantageous as compared to prior coil spacings and oscilloscope tests without the amplifier of Fig. 7 indicated that three-eighths of an inch is very desirable spacing. However, it is the response through an amplifier that counts, and, therefore, the zero spacing is preferred. The tests with the amplifier not only indicate that the coils are most responsive to fissures with zero spacing but also that with this same zero spacing, they are least responsive to other irregularities. In the case of the burn on which these tests were conducted, a spacing of one-eighth of an inch was found to increase the responsiveness to burns by almost ten per cent. With the corrugated rail on which these tests were made, a spacing of one-half an inch was found to increase the responsiveness to corrugations approximately twenty per cent. The comparison in each instance was with the zero spacing in which the coils were most responsive to fissures and least responsive to burns and corrugations. This explains why, with these particular coils, the zero spacing is so greatly preferred in spite of the fact that any reduction of the spacing below one-half an inch represents an improvement over prior practice.

When, as with the illustrated structure, zero spacing is desirable, the two coils may be built separately and brought end to end or may be built as one structure. From some standpoints, this structure may be regarded as having a single central pole. In the Fig. 7 form, this central pole face is twice as large as the end poles. This is the type of structure which was disclosed in our prior application and was believed to come very close to giving perfect coincidence of the waves in the case of a fissure because the results were so much better than with any previous pickup.

Of course there may be some other explanation for getting the maximum combined voltage from fissures and best distinction between fissures and other irregularities when the coils are end to end. It seems clear that each coil would have some effect on the other. In the first place, each coil would have an inductive effect on any current flow produced by the other coil. In the second place, each core would have some effect on the flow of magnetism through the other core. The first of these effects very probably creates a great differential between the external effects of a voltage induced in one coil and the external effect of a voltage induced in both coils simultaneously. If the effect of each core on the flux in the other may cause a relatively sudden shifting of flux from one core to the other so that the flux is rapidly decreasing in one core while it is rapidly increasing in the other core, this would produce voltages of like polarity in the two coils since the coils are connected in series-opposition, so that a high combined voltage would be produced. If such is the underlying explanation, it appears that zero spacing produces the most sudden shift in flux from one core to the other in the case of fissures, but that this does not occur in the case of other irregularities.

Regardless of the underlying reason, it is an important observed fact that zero spacing produces a great differential between the maximum combined voltages of fissures and non-fissure irregularities, and it is that fact which makes the use of two coils with this spacing highly desirable as compared to the use of a single coil even though the use of the single coil of the one inch length or less is in itself highly desirable as compared to the use of prior art single coils or even as compared to the use of prior art paired coils with the wide spacing of the prior art.

If it were found for any particular stretch of track that some particular type of non-fissure irregularities gave trouble with the end to end relationship, or any other spacing which yields the maximum fissure voltage, a slightly different spacing would be desirable if by taking advantage of a peculiarity of a particularly troublesome type of irregularity, it would give greater difference of voltage between the fissure impulses and the impulses of that particular type irregularities.

The amplifying circuits capable of taking the fullest advantage of the great voltage difference produced by the pick-ups of this invention are illustrated in Figs. 14 and 15. For the most part, these circuits will be sufficiently understood from the circuit diagrams but certain special features should be pointed out and disclosed in detail. It will be understood that the values appearing beside the condensers are microfarads and those beside the resistances are ohms.

One of the considerations believed to be important is that the lead 36 from the detector coils 26 and 27 be connected to the grid 41 of the first amplifying tube 40 by a coupling of low or substantially no inductance. Preferably, the lead 36 is connected directly to the grid 41 as in the illustrated forms. An iron core transformer coupling might undesirably favor the longer impulses of surface defects while a condenser coupling might undesirably favor extraneous high frequency disturbances.

Another important characteristic of the circuits is the ability to cut off sharply any impulse below a predetermined voltage, preferably an adjustable voltage. In Fig. 14, this is accomplished mainly by the first two tubes in a manner which can best be explained by reference to Fig. 16 showing the tube characteristics.

The first tube 40 of the amplifier of Fig. 14 is a 6K7 tube with the grid 41 so connected that it normally operates at zero voltage, this resulting from the connection of the grid 41 through a grid leak 42 with common or ground wire 38 to which the cathode 43 is also directly connected.

Figure 16:
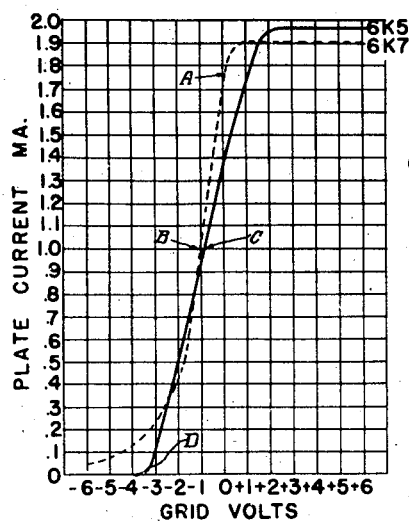
Fig. 16 is a chart indicating the tube characteristics of the first four tubes in Fig. 14.

With reference to the dotted line curve of Fig. 16, it is seen that the zero grid voltage for this tube is at point A on the curve, meaning that the flow of electrons through the tube from cathode 43 to plate 44 is nearly at the maximum value possible with the plate voltage used. As a result, an impulse of positive polarity impressed on grid 41 by coils 26 and 27 will have practically no effect, its maximum effect being an increase of plate current of only approximately .1 milliampere. A negative impulse from coils 26 and 27 on the other hand can have a very great effect, reducing the plate current from approximately its maximum to approximately zero. Thus the tube is practically unresponsive to positive impulses but is very sensitive to any negative impulses. It cuts off positive impulses and passes negative impulses on to the next tube 50. The grid 51 of this second tube has impressed on it a negative grid bias, the voltage of which is preferably adjustable by means of a sliding potentiometer contact 39.

As seen from the full line curve of Fig. 16, which shows the characteristics of tube 50, a grid bias of three and one-half volts negative puts the plate current between cathode 53 and plate 54 practically at zero. If the potentiometer contact 39 is set for a three and one-half volt negative bias, a small negative impulse from coils 26 and 27 amplified by tube 40 will impress a sufficient positive voltage on grid 51 to cause a plate current to flow to plate 54. The voltage impulse resulting from this plate current can be amplified by tubes 60, 70, and 80 to operate a relay 91. However, if the potentiometer contact 39 is set to apply a greater negative bias to grid 51, a stronger negative impulse from coils 26 and 27 will be required to make a plate current flow in tube 50 and ultimately cause operation of relay 91. Relay 91 will, of course, control the recording instruments, such as the pen on the moving chart and the paint gun for shooting a spot of paint on the rail. Generally speaking, whatever bias is impressed on grid 51 in excess of the three and one-half volt shut-off bias, must be supplied by the amplified negative voltage of the coils 26 and 27 before the recording or actuating relay 91 will operate. Hence these first two tubes cut off all impulses of lower voltage, the cut-off level being controlled by contact 39.

The exact setting of the potentiometer contact 39 will depend on various considerations including the character of rail being tested. Where there are very few non-fissure irregularities, the grid setting may be such as to apply a bias to grid 51 close to the shut-off bias of three and one-half volts negative so that fairly slight impulses from the pick-up coils 26 and 27 will produce operation of the recorder relay 91. In this event, the occasional severe non-fissure irregularities will also be recorded and will have to be eliminated by a hand check or by visual inspection, or by a re-run with a different setting of the potentiometer contact 39. Even a setting of 3½ volts, or perhaps 3¼ volts, would have at least some partial cut-off effect because operation on the knee of the curve represents inefficient amplification. In track where there are a large number of non-fissure irregularities, it may be desirable to set the potentiometer contact 39 for a negative bias of grid 51 considerably in excess of 3½ volts so that none or substantially none of the non-fissure defects will be recorded. Due to the exceptionally high discrimination of this invention, an extremely high percentage of fissures will nevertheless be recorded. Generally speaking, these may include all except the very small fissures which are less important than the larger ones and may be caught at the next testing of the rail if they grow larger in the meantime.

The tubes 60 and 70 preferably have their grids 61 and 71 so biased that the tubes operate at mid-points B and C on their respective curves for most effective amplification of an impulse transmitted to them by the tube 50. The tube 80 is a power tube which operates the recorder relay 91.

It should be noted that one or more by-pass condensers 37 and 59 may be provided, the former being across the input leads and the latter between plate of tube 60 and the ground conductor 38. The purpose of this is to relatively reduce the voltage level of impulses resulting from sparking, 60 cycle effects and the like which have no relationship to flaws in the rail and which are apparently produced independently of residual rail magnetism. Since the wave length of fissure impulses probably corresponds to a frequency no higher than about 35 cycles per second, the condensers 37 and 59 are selectively more effective for the higher frequencies resulting from such external disturbances. Accordingly, substantially all of the external disturbances passing tube 50 are eliminated by the condenser 59 so that very few, if any, false indications will be caused by them.

Once the non-fissure impulses have been eliminated, the problem becomes one of actuating the recorder relay 91 with the fissure impulses in spite of their short duration and in spite of the fact that some of them may be just barely strong enough to be passed on by the first two tubes 40 and 50. One important aid which can be used if desired for accomplishing this result seems to be in the provision of a grid leak 72 of relatively high resistance at the tube 70. The effect of this is to make the impulses impressed on grid 71 by tube 60 through coupling condenser 68 last longer than would normally be the case with a conventional resistance in the grid leak. In other words, the impulses are, relatively speaking, stretched out to have a longer duration. This gives the tube 80 time enough to operate the relay 91. This feature may be omitted or tempered, if desired, especially when it is not considered essential to record voltages just above the cut-off value, as when the contact 39 is adjusted to cut off only very low voltages. A value of 250,000 ohms for grid leak 72, with a .1 microfarad condenser at 68 has been found to give adequate holding characteristics under these conditions, and is at present preferred.

The circuit of Fig. 15 produces results similar to those of Fig. 14, although in a somewhat different manner. Some features are quite similar. The coils 26 and 27 are directly connected to grid 41' of tube 40'. A by-pass condenser 59' is connected between plate 57' of tube 50' and ground wire 38'. In this instance, the condenser will be smaller than the condenser 59 since tubes 40' and 50' do not amplify as much as tubes 40, 50 and 60. A value of .1 microfarad now seems proper. It should be noted, however, that under some circumstances, it may be desirable to eliminate this by-pass for the sake of obtaining greater sensitivity.

In Fig. 15, both the cut-off and stretch-out functions are largely accomplished by the same tube which is of the type known as a trigger tube. It gets this name from the fact that if the grid voltage is very slightly above the cut-off bias, the tube will carry its maximum plate voltage. The amount that the grid 161 is biased below its cut-off bias is determined by adjustment of the potentiometer contact 39'. In general, whenever the amplified voltage is high enough to bring the grid voltage above the cut-off value, a heavy plate current will flow to plate 165 and this in turn will impress a maximum charge on coupling condensers 169, thus enabling the tube 80' to actuate the relay 91. It will be observed that the tube 160 not only greatly amplifies the momentary intensity of the impulse but also stretches it out in duration due to the very high charge imposed on condenser 169 which is not instantaneously nullified by grid leak 82, even though the grid leak 82 is of much lower resistance than the grid leak 72 of Fig. 14.

It is desirable to provide a sliding contact 157 for shunting out a part of the plate circuit resistance 168 so as to adjust the selectivity of the circuit in weeding out the very slight impulses in the plate current of tube 160 when this plate current is at or near its minimum value. It should be understood that the cut-off bias of grid 161 does not reduce the current quite to zero.

A further sensitivity adjustment may be made at 162.

In both Figs. 14 and 15 there is preferably provided a jack 93 for plugging in a sensitometer or other test equipment. Likewise a milliammeter 94 is preferably provided in the out-put circuit.

At the present time, the circuit of Fig. 14 is preferred to that of Fig. 15 because it is an exceptionally stable circuit and because the single adjustment of the potentiometer contact 39 is all that is required and very satisfactorily selects the voltage level below which impulses are killed.

A special advantage flows from amplifying only one side of the impulse wave produced by the pick-up coils 26 and 27. Some surface defects produce a wave which is of the opposite polarity from the fissure wave. The result is that when two coils are properly connected to the amplifier in such a way that their coinciding or overlapping half waves are of the polarity which will be amplified (negative in Fig. 14), the corresponding overlapping half waves of the surface defects will be in the opposite polarity which is not amplified. Hence there will not be present in the portion of the impulse which is amplified any additive effect from the two coils while there will be such additive effect in the case of fissures. With the two coils connected in series-opposition as here, the impulse of a single coil is naturally of lower voltage than if it were not held down by the idle coil in series with it. All of these factors assist in distinguishing between fissures and surface defects. It should be noted, however, that even where the fissures and surface defects produce waves of the same polarity, the voltage increasing effect resulting from the proper coil spacing in the case of fissures is so much greater than in the case of non-fissure irregularities that surprising powers of distinguishing are obtained.

The positive portion of the fissure wave could be used and would have to be used if the first tube were chosen for cutting out the low voltages. It is preferred, however, to amplify the voltages from the pick-up unit before cutting out the lower voltages so that the border-line effects in the cut-off tube will be small as compared to the range of voltages impressed upon it. In Fig. 14, the second tube has been chosen as the cut-off tube and hence the negative part of the fissure wave applied to the first tube produces the necessary positive voltage at the grid of the second tube. No matter which tube is chosen to serve as the cut-off tube, it is preferred that each tube preceding it operate near one end or the other of its output curve to eliminate the possibility of its passing on a voltage of polarity opposite to that which it is intended to pass on.

Where the apparatus is to be used in conjunction with a magnetizing system in which the polarity can be reversed, means should also be provided for reversing the polarity of the connections between the pick-up unit (coils 26 and 27) and an amplifying circuit so that it will always be the combined fissure wave of intended polarity which will be amplified.

Apparatus embodying the coils herein illustrated connected to the amplifier illustrated in Fig. 14 has been found to give exceptional results. With this apparatus, it is possible (if the sensitivity adjustment at 39 is not too high) to test the rail to within two or three inches of the rail end, if not all the way to the rail end. This is apparently because the magnetic disturbances adjacent the joint bars and the bolt holes are of relatively long wave length so that the circuit of Fig. 14 is able to discard the impulses resulting therefrom even though it would at the same time respond to a fissure impulse.

It will also be observed that since the two coils are connected in series-opposition, any stray impulses of the nature which might result from the passage of a fluctuating current through the rail will be balanced out. This renders the system appropriate for use in rails where alternating currents are used either for signalling or train propulsion and it also renders the equipment satisfactory for use as part of the electro-inductive system of testing. In the latter system the rail is energized by a current passing therethrough and the coils run along a portion of the rail through which the current is passing. A different spacing of the coils might be found to give better results with such a system, especially if transverse coils are used in place of the coils here illustrated, although the optimum spacing could readily be found in accordance with the principles above described. Although the detecting apparatus is suitable for use in such a system and would have advantages there over apparatus now used in such systems, its greatest advantage is attained in connection with the residual magnetic system.

This same balancing-out effect can be obtained by connecting the coils in parallel with such a polarity of their connections that a common flux change will produce a mutual short-circuiting effect in which the voltage induced in each coil tends to draw through that coil the current which the other coils tends to produce. Thus one lead from the amplifier would be connected to the positive end of one coil and the negative end of the other coil so that the net voltage impressed on the lead is zero. When the two coils are differentially acted upon, as by passing over a fissure, they would both produce voltage of the same polarity on this lead and hence a relatively heavy current would be available. With such connections, or with any other balancing-out provision, a different coupling with the amplifier and even a different amplifier may be desired.

At the present time, however, it is preferred to use the series-opposition connection with the illustrated amplifiers, particularly that of Fig. 14.

As previously mentioned, the results obtained from the pickup unit of the type indicated by Fig. 7 in combination with the circuit of Fig. 14 were so much superior to prior results that the assumption seemed warranted that the peaks 32 and 131 were almost perfectly coincident. Although it was recognized that a reduction in the thickness of the combined central pole or a perfect coincidence of the adjacent poles of the two coils might produce some further improvement, it was not realized that the gains from this would be very great.

It has now been determined that the core structure shown in Figs. 2 to 5 and indicated also in Fig. 8 is very decidedly better than that represented by Fig. 7. In this structure, each of the core members is provided with an inclined leg 201 so that the longitudinal positioning of the trailing pole of the front core coincides with the longitudinal positioning of the leading pole of the rear core. The advantage of this is perhaps seen best by comparing the theoretical curves in Figs. 7 and 8.

In Fig. 7, it is assumed that the second peak 32 occurs when the middle of the first intermediate pole passes over the fissure while the first peak 131 of the second coil occurs when the second intermediate pole passes over the fissure. This would separate these peaks by the amount shown in Fig. 7 which represents the phase displacement of the two waves. The combination peak 203 is considerably higher than the peaks 32 and 131 but not quite twice as high.

In Fig. 8, however, the peak 32 is somewhat retarded by the first slanting pole leg 201 while the peak 131 is somewhat advanced by the other slanting pole leg 201. The result is that the two peaks coincide exactly or at least more closely than in Fig. 7. The peak 135 in Fig. 8 has, therefore, been shown as twice as high as the peak in that figure representing the voltage peaks 32 and 131. The results in actual use have shown that the Fig. 8 structure is much better than the Fig. 7 structure whether or not this theory of the underlying reason is correct.

Nevertheless, the Fig. 8 structure does not seem to be quite the ideal from the theoretical standpoint. It would seem that under some flux conditions, the slanting poles 201 would cause a less rapid change of flux than would a pole perpendicular to the line of motion. Furthermore, in the areas 204, the combined pole is twice as thick as a single pole so that in this area, the advantage of the slanting poles is not apparent. In Fig. 8, this theoretical lack of perfection has been indicated by showing the peak 32, 131, slightly lower than the corresponding peaks in Fig. 7, suggesting that considering each peak alone, there might be some loss of voltage. It is seen from Fig. 8 that nevertheless the combined peak 135 is considerably higher than the combined peak 203 of Fig. 7. It is evident, however, that if the peaks 32, 131, can be brought up to full value without loss of proper coincidence, there will be still further gain. This is represented diagrammatically in Fig. 9 in which the core structure is illustrated having a single intermediate pole perpendicular to the coil axis and direction of movement and of the same thickness as the end poles. In this figure, the peak 32, 131, has been shown as of the same height as in Fig. 7, and, therefore, the combined peak 135 in this figure is higher than the combined peak 135 in Fig. 8.

Although the structure of Fig. 9 seems to be ideal from the standpoint of theory, its production presents some problems. It does not lend itself to a laminated construction.

There appears to be no extreme necessity for laminations in this core structure, so that the gain from the theoretical consideration indicated by Fig. 9 will more than offset the eddy current losses resulting from failing to laminate. Accordingly, the core indicated by Fig. 9 may be made as shown in Fig. 10, the entire structure being of one piece. It could be cut from a single block of appropriate iron or steel, or it could be cast to the shape shown, with poles 209 connected by integral bridges 210, on which are wound coils 26 and 27.

A structure very similar to that of Fig. 9 from the theoretical standpoint may also be made from laminations, as illustrated in Fig. 11. Here the first pole 211 has been connected with the second pole 212 by bridge 213 in the conventional manner as illustrated in Fig. 6. One coil would be wound on this bridge. The second pole 212 and the third pole 214 are connected by a bridge 215 at their ends. This bridge is raised above the level of poles 212 and 214 so as to make room for the winding of a coil thereon.

This invention, especially the combination of pickup of Fig. 2 and the amplifying circuit of Fig. 14, have proved themselves to be extremely effective and highly selective for fissures. In fact, they have proved themselves so selective that it seems quite possible that not all the reasons underlying this selectivity have yet been ascertained. For example, Fig. 13 represents overlapped impulses such as might be expected from a burn. Although the peaks 34 and 133 do not perfectly coincide, there is enough overlapping so that they would be expected to produce a fairly high combined peak. However, the results in use seem to indicate that ordinarily non-fissure irregularities do not produce a high combined peak. In fact, results suggest that the combined peak may have a voltage even lower than the voltage which would be represented by the peak 34 alone. This might result from the fact that with two very short cores in contact with one another at their ends, the non-fissure type of field tends to flow through both cores rather than just through one. Since the opposition connection of the coils causes any change in this common flux to produce no voltage, the combined voltage peak might be much lower than if a single coil were used. It may be observed in this connection that even though the structures of Figs. 10 and 11 might prove less sensitive to fissure fields than would theoretically be assumed, the opportunity for passing of flux from one end core to the other may be so good that the longer non-fissure fields will have almost no effect on these coils. In that event, there would be a gain in selectivity which would more than offset any small loss in sensitivity. There is already plenty of sensitivity to spare with the result that selectivity is of primary importance.

Even with the pickup unit of Figs. 2 to 5 which is not quite perfect in theory, it is possible to set the sensitivity adjustment 39 to a much lower value than has been required with the Fig. 7 type of pickup to detect a very small fissure which prior to our development of the present invention disclosed in our prior application would not ordinarily have been detected at all. It now appears to be possible to detect fairly small fissures under burns and in the rail between the joint bars right to the end of the rail. The sensitivity adjustment at contact 39 should, of course, be such as to give the grid 51 the least bias that will reduce the number of false indications to a satisfactory number.

The principle is to selectively build up the voltages induced by fissures so that small fissures produce a greater voltage than non-fissure irregularities and then bias the grid 51 so that few if any of the voltages produced by non-fissure irregularities will bring the grid bias above the cut-off knee D in Fig. 16. No matter what the setting of the contact 39, this principle will be partially utilized if the setting provides a grid bias on the cut-off knee D of the curve because even on the knee, the tube is inefficient. It will be fully utilized so long as this setting provides a grid bias greater than the cut-off value for the tube. With a setting only slightly exceeding this tube cut-off value, this invention will come close to providing the maximum flaw-detecting ability. With a setting considerably beyond the tube cut-off value, the invention will come close to providing the maximum ability to distinguish between fissures and all non-fissure irregularities.

Certain advantages can be attained by using two detector-amplifier units each including a pair of coils similar to those shown in Fig. 2 and an amplifier similar to that shown in Fig. 14, the contact 39 in one unit being set for negative grid bias slightly exceeding the cut-off value of the tube and in the other unit being set for a greater grid bias which will cut out voltages induced in the pick-up coils 26 and 27 by all non-fissure irregularities with the possible exception of extraordinarily powerful ones. This combination will detect very small fissures with the low cut-off unit and will not record any low-power non-fissure irregularities such as many gags and magnetic spots. It will ordinarily govern the train crew when there is no visible non-fissure irregularity that would have caused the response of this unit. In thus eliminating some of the most troublesome non-fissure irregularities— those which can't be seen and hence necessitate hand-checking—it will produce a much cleaner record, speed up the testing and result in fewer errors of judgment. Even when there is a visible non-fissure irregularity which justifies the crew in disregarding this unit, the high cut-off unit will serve as a safeguard against missing any fissures except the very small fissures. The crew will know that when the high cut-off unit responds, other than with its usual rail-end indication, there is a very strong probability that a fissure is present in addition to any visible irregularity. In this situation, therefore, the crew should always stop and make a hand-check unless the presence of a fissure can otherwise be determined or negatived.

Of course with both units the exact adjustment may depend somewhat on track conditions. If there are very few extreme burns, the high cut-off unit may be adjusted for a somewhat lower cut-off value than if there are a lot of extreme burns, the adjustment in any event being such that the number of responses made when no fissure is present will not be so great as to unduly retard the test run. It may be noted that a single unit is now giving such good results that there may never be any need to use two units.

It may be helpful to describe more completely the coils that have given these excellent results although wide departures from these details may be found harmless. The coils that have been tested with the best results are each of 10,000 turns #42 enameled wire, the two coils thus having 20,000 turns. Each coil is wound on a core of 12 laminations of transformer steel of .014" thickness, the pole width of the core being 2" transversely of the rail, and the width of the laminations within the coil being ½", and the outside length of the core being about 1⅛" maximum (¾" along the center line). A core height (to top of core) of about ⅞" is required to make room for the winding. Preferably the core should be of low reluctance.

As the pickup is moved along the rail, it has been found satisfactory to space it above the rail ⅛" by means of a carriage sliding on the rail as disclosed in our patent 2,317,720. Also as disclosed therein the pickup is preferably mounted in a box. The bottom of this box occupies part of the ⅛", and may be formed of ⅛" brass.

Although the coil above described is very desirable with any amplifying circuit, it should be emphasized that best results are obtained in conjunction with the amplifying features of the present invention. It has previously been proposed to distinguish between fissures and surface defects by differential pen relays, one actuated only by the greater outputs. However, results comparable to those of the present invention have not previously been obtained. This is probably in part because the difference in wave shapes was overlooked and the low sensitivity relay had to be so extremely low in sensitivity in order to avoid being actuated by the relatively long wavelength surface-defect impulses that it was only actuated by relatively large transverse fissures in view of their relatively short wave lengths. Also the prior art suggestions have completely lacked the concept of cutting out within the amplifier everything below a given voltage no matter what its wave shape, and the concept of pure voltage-response unaffected by questions of duration resulting from different wave shapes between the fissure and non-fissure impulses induced in the coil by the magnetic field of the rail.

From the foregoing, it is seen that a method and apparatus for detecting hidden flaws in rail by a car running on the rail has been devised which is far superior to prior systems particularly in its ability to distinguish between small fissures and relatively severe non-fissure irregularities. and in its ability to record the fissures while the impulses resulting therefrom are of very short duration although maintaining a clean record when impulses of longer duration but resulting from surface defects are encountered.

The term "fissure" is intended to include not only those cleavages which originate internally of the rail, but also those, sometimes termed "detailed fractures" which may originate on the surface of the rail. These are differentiated from "non-fissure" defects such as burns, gags, corrugations, etc.

We claim:
1. Progressive flaw detecting apparatus including a pair of coils having cores therethrough with their poles longitudinally disposed with respect to one another, said cores having substantially no spacing between them longitudinally and each having a pole positioned longitudinally between the coils.

2. Progressive flaw detecting apparatus including a pair of coils having cores therethrough approximately one inch long with their poles longitudinally disposed with respect to one another, said cores being longitudinally substantially abutting one another and each having a pole positioned longitudinally between the coils.

3. A detector unit for flaw detection of the type in which a rail is progressively subjected to a magnetic force and then inductively searched for characteristic magnetic fields in the vicinity of flaws including a coil and a core extending through said coil having two poles at opposite sides of the core at least one of said poles being adapted to extend across a substantial portion of a rail-head and said poles being spaced apart at their furthest edges not over approximately one inch.

4. Progressive flaw detecting apparatus including core means having forward, intermediate and rearward poles adapted to lie close to a ferromagnetic body to be tested and connecting magnetic portions, one extending between the forward pole and the intermediate pole, and one extending between the rearward pole and the intermediate pole, windings on said connecting portions connected together and to lead wires with such polarity as to cooperate in impressing an impulse on the lead wires in response to a decrease of flux in one direction through one coil and an increase in flux in the same direction through the other coil, said core means forming approximately a continuous magnetic circuit from the forward pole to the rearward pole.

5. In a rail flaw detecting apparatus in which a rail is progressively subjected to a magnetic force and then inductively searched for characteristic magnetic fields in the vicinity of fissures, a pair of coils each having a core therethrough and each core having pole means at opposite ends of its coil, the pole means for each coil closest to the other coil being positioned within half an inch of the other such pole means longitudinally of the apparatus, and said coils being connected in opposition.

6. A pick-up for progressive flaw detection in rails comprising core means having front, intermediate and rear pole means and coils thereon between the front and intermediate and between the intermediate and rear pole means connected in opposition, the front and rear pole means being integrally connected magnetically by said core means.

7. Flaw detection apparatus for progressively detecting fissures in a ferromagnetic body which has been energized to produce characteristic fields adjacent fissures and different fields adjacent non-fissure irregularities including a pick-up having core means disposed for movement along the body in a given direction and having front, intermediate and rear pole means, and coil means surrounding the core means having opposite responses to a given flux change between the front and intermediate and the intermediate and rear pole means; the front and rear pole means being integrally connected magnetically by said core means and each successive pair of connected pole means lying approximately within a length of one inch.

8. Progressive flaw detecting apparatus including a pair of coils connected in series opposition and core structure extending therethrough having intermediate pole means between the coils and end pole means beyond each coil from the intermediate pole means, both of the end pole means being included within a length approximately as short as one and one-half inches and the magnetic structure connecting the various poles being substantially free of air gaps.

9. Progressive flaw detecting apparatus including a pair of coils connected in series opposition and core structure extending therethrough having intermediate pole means between the coils and end pole means beyond each coil from the intermediate pole means, both of the end pole means being included within a length approximately as short as one and one-half inches and the magnetic structure connecting the various poles being substantially free of air gaps, and each of the end pole means being integrally connected to at least a part of the intermediate pole means which approximately coincides in an axial direction with the positioning of the part of the intermediate pole means integrally connected to the other end pole means.

10. Progressive flaw detecting apparatus including a pair of similar coil and core structures, each having a central core portion on which a coil is mounted, a pole piece at one end of each central core portion, integral therewith and extending laterally to either side thereof at substantially right angles thereto and a pole piece integral therewith at the other end which in part at least is inclined at an oblique angle to the axis of the coils; the inclined pole pieces overlapping axially of the coils, and said coils being connected in series opposition.

11. Progressive flaw detecting apparatus including a pair of similar coil and core structures, each having a central core portion on which a coil is mounted, a pole piece at one end of each central core portion, integral therewith and extending laterally to either side thereof at substantially right angles thereto and a pole piece integral therewith at the other end which in part at least is inclined at an oblique angle to the axis of the coils; the inclined pole pieces overlapping axially of the coils, and bearing against one another over a substantial area to provide a low reluctance path between them, and said coils being connected in series opposition.

12. In rail flaw detecting apparatus in which a rail is progressively magnetized and then inductively searched for traces of residual magnetism in the vicinity of fissures, the improvement which consists in providing an inductive pick-up comprising two tandem substantially abutting iron core portions, each core portion being not substantially longer than one inch in length and having a coil wound thereon, with the coils of the two core portions connected in series opposition.

13. In a rail flaw detecting apparatus in which a rail is progressively magnetized and then inductively searched for traces of residual magnetism in the vicinity of fissures, the improvement which consists in providing an inductive pick-up having core means comprising two tandem substantially abutting iron core portions, each core portion being not substantially longer than one inch in length and having a coil wound thereon, with the coils of the two core portions connected in series opposition, and transverse end and intermediate portions associated with said core means and projecting downwardly from the core portions.

14. In rail flaw detecting apparatus in which a rail is progressively magnetized and then inductively searched for traces of residual magnetism in the vicinity of fissures, the improvement which consists in providing an inductive pickup comprising two longitudinally arranged core portions having the rear end of one core portion, considered with reference to the direction of pick-up movement, in substantial lateral alignment with the forward end of the other core portion, each core portion being not substantially longer than one inch in length and having a coil wound thereon, with the coils of the two core portions connected in series opposition.

15. In rail flaw detecting apparatus in which a rail is progressively magnetized and then inductively searched for traces of residual magnetism in the vicinity of fissures, the improvement which consists in providing an inductive pickup comprising two core members, each having integral, downwardly extending pole portions at each end thereof, and arranged so that the core members are in substantial longitudinal alignment with the juxtaposed poles in close proximity to each other and substantially abutting relationship, the length of each core member being not substantially greater than one inch, and coils on the two core members connected in series opposition.

16. In rail flaw detecting apparatus in which a rail is progressively magnetized and then inductively searched for traces of residual magnetism in the vicinity of fissures, the improvement which consists in providing an inductive pickup comprising two core members, each having integral, downwardly extending pole portions at each end thereof, and arranged so that the core members are in substantial longitudinal alignment with the juxtaposed poles in close proximity to each other and substantially abutting relationship, the length of each core member being not substantially greater than one inch, and coils on the two core members connected in series opposition, one of the juxtaposed poles extending laterally from its core member on one side only and the other of the juxtaposed poles extending laterally from its core member on the other side only.

17. In rail flaw detecting apparatus in which a rail is progressively magnetized and then inductively searched for traces of residual magnetism in the vicinity of fissures, the improvement which consists in providing an inductive pickup comprising two core members, each having integral, downwardly extending pole portions at each end thereof, and arranged so that the core members are in substantial longitudinal alignment with the juxtaposed poles in close proximity to each other and substantially abutting relationship, and coils on the two core members connected in series opposition, one of the juxtaposed poles extending laterally from its core member on one side only and the other of the juxtaposed poles extending laterally from its core member on the other side only, each of said laterally extending juxtaposed poles being inclined in the direction of the other core member.

WALTER C. BARNES.
HENRY W. KEEVIL.

REFERENCES CITED

The following references are of record in the file of this patent:

UNITED STATES PATENTS

| Number | Name | Date |
|---|---|---|
| 1,960,968 | Drake | May 29, 1934 |
| 2,089,967 | Keevil | Aug. 17, 1937 |
| 2,104,682 | Tellegen | Jan. 4, 1938 |
| 2,109,455 | Barnes et al. | Mar. 1, 1938 |
| 2,133,687 | Drake | Oct. 18, 1938 |
| 2,223,371 | Keevil | Dec. 3, 1940 |
| 2,276,011 | Billstein | Mar. 10, 1942 |
| 2,313,729 | Barnes | Mar. 16, 1943 |
| 2,388,683 | Frickey et al. | Nov. 13, 1945 |